United States Patent
Kong et al.

(10) Patent No.: US 10,756,320 B2
(45) Date of Patent: Aug. 25, 2020

(54) METHOD FOR MAKING A LITHIUM-SULFUR BATTERY SEPARATOR

(71) Applicants: Tsinghua University, Beijing (CN); HON HAI PRECISION INDUSTRY CO., LTD., New Taipei (TW)

(72) Inventors: Wei-Bang Kong, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/974,777

(22) Filed: May 9, 2018

(65) Prior Publication Data

US 2018/0351146 A1    Dec. 6, 2018

(30) Foreign Application Priority Data

Jun. 5, 2017   (CN) .......................... 2017 1 0415506

(51) Int. Cl.
*H01M 2/14*         (2006.01)
*H01M 10/052*      (2010.01)
(Continued)

(52) U.S. Cl.
CPC ............. *H01M 2/145* (2013.01); *H01M 2/16* (2013.01); *H01M 2/1613* (2013.01); *H01M 2/1646* (2013.01); *H01M 2/1686* (2013.01); *H01M 4/38* (2013.01); *H01M 4/5815* (2013.01); *H01M 10/052* (2013.01); *B82Y 40/00* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2008/0029790 A1\* 2/2008 Ahn .................. H01L 21/28255
                                                            257/288
2011/0027486 A1   2/2011 Jiang et al.
(Continued)

FOREIGN PATENT DOCUMENTS

CN    101988874    3/2011
CN    103493253    1/2014
(Continued)

OTHER PUBLICATIONS

Liu Wei Liang, Advanced Ceramics, Aug. 31, 2004, 174-178, Wuhan University of Technology Press.

*Primary Examiner* — Zhongqing Wei
(74) *Attorney, Agent, or Firm* — ScienBiziP, P.C.

(57) ABSTRACT

A method for making a lithium-sulfur battery separator includes providing a separator substrate comprising a first surface and a second surface opposite to the first surface; and forming a functional layer on at least one of the first surface and the second surface. A method of forming the functional layer includes providing a carbon nanotube layer comprising a plurality of carbon nanotubes; etching the carbon nanotube layer to form defects on surfaces of the plurality of carbon nanotubes; and forming a hafnium oxide layer on the defects to form a carbon nanotube/hafnium oxide composite layer.

18 Claims, 15 Drawing Sheets

(51) Int. Cl.
  *H01M 2/16*   (2006.01)
  *H01M 4/58*   (2010.01)
  *H01M 4/38*   (2006.01)
  H01M 4/02   (2006.01)
  B82Y 40/00   (2011.01)

(56) References Cited

U.S. PATENT DOCUMENTS

| | | | | |
|---|---|---|---|---|
| 2011/0256451 A1* | 10/2011 | Cui | ............... | B32B 5/26 |
| | | | | 429/218.1 |
| 2013/0244082 A1 | 9/2013 | Lee et al. | | |
| 2013/0320453 A1* | 12/2013 | Pethe | ............ | H01L 29/7854 |
| | | | | 257/368 |
| 2015/0274527 A1* | 10/2015 | Ma | ............... | C01B 32/16 |
| | | | | 264/235 |
| 2016/0043370 A1* | 2/2016 | Hatta | ............ | H01M 2/145 |
| | | | | 307/10.1 |

FOREIGN PATENT DOCUMENTS

| | | |
|---|---|---|
| CN | 104947073 | 9/2015 |
| CN | 105140447 | 12/2015 |
| CN | 105261721 | 1/2016 |
| CN | 105261721 A | 1/2016 |
| TW | 201320446 A | 5/2013 |

\* cited by examiner

```
┌─────────────────────────────────────────────────────────────┐
│ providing a separator substrate 110, wherein the separator  │
│ substrate 110 comprises a first surface and a second        │
│ surface opposite to the first surface                       │
└─────────────────────────────────────────────────────────────┘ ⟵ S1
                              │
                              ▼
┌─────────────────────────────────────────────────────────────┐
│ forming at least one functional layer 120 on at least one   │
│ surface of the first surface and the second surface, which  │
│ comprises sub-steps of:                                     │
│                                                             │
│   ┌───────────────────────────────────────────────────┐    │
│   │ providing a carbon nanotube layer 122 comprising a│    │
│   │ plurality of carbon nanotubes                     │    │
│   └───────────────────────────────────────────────────┘ ⟵ S21
│                         │                                   │
│                         ▼                                   │ ⟵ S2
│   ┌───────────────────────────────────────────────────┐    │
│   │ etching the carbon nanotube layer 122 to form a   │    │
│   │ plurality of uniform and continuous defects on    │    │
│   │ each surface of the plurality of carbon nanotubes │    │
│   └───────────────────────────────────────────────────┘ ⟵ S22
│                         │                                   │
│                         ▼                                   │
│   ┌───────────────────────────────────────────────────┐    │
│   │ forming a continuous hafnium oxide (HfO₂) layer   │    │
│   │ 124 on each surface of the plurality of carbon    │    │
│   │ nanotubes by an atomic layer deposition (ALD)     │    │
│   │ method, to form a carbon nanotube - HfO₂          │    │
│   │ composite layer                                   │    │
│   └───────────────────────────────────────────────────┘ ⟵ S23
└─────────────────────────────────────────────────────────────┘
```

FIG. 8

METHOD FOR MAKING A LITHIUM-SULFUR BATTERY SEPARATOR

CROSS-REFERENCE TO RELATED APPLICATIONS

This application claims all benefits accruing under 35 U.S.C. § 119 from China Patent Application No. 201710415506.2, filed on Jun. 5, 2017, in the China Intellectual Property Office, the contents of which are hereby incorporated by reference. The application is also related to copending applications entitled, "LITHIUM-SULFUR BATTERY SEPARATOR AND LITHIUM-SULFUR BATTERY USING THE SAME", filed Ser. No. 15/974,773.

FIELD

The present disclosure relates to a method for making lithium-sulfur battery separator.

BACKGROUND

In a lithium-sulfur battery, the cathode is made of sulfur and the anode is made of elemental lithium. During electrical discharge process, the elemental lithium loses electrons to become lithium-ion, and the sulfur reacts with the lithium-ion and electrons to produce lithium sulfides. A reaction equation is: $S_8+16Li^++16e^{-1}=8Li_2S$. A lithium-sulfur battery has advantages of low-cost, environmental friendliness, good safety, and high theoretical specific capacity.

A separator is an important component in the lithium-sulfur battery. The separator separates the cathode and the anode to avoid an internal short-circuit. However, the lithium-sulfur battery separator obtained by a conventional method is difficult to inhibit polysulfide diffusion. The polysulfide would be shuttled between the cathode and the anode, an irreversible damage to a structure of the cathode containing sulfur would be occurred. Thus the specific capacity and cycling stability of the lithium-sulfur battery would be limited.

BRIEF DESCRIPTION OF THE DRAWINGS

Implementations of the present technology will now be described, by way of example only, with reference to the attached figures, wherein:

FIG. 8 is a flow chart of one exemplary embodiment of a method for making a lithium-sulfur battery separator.

DETAILED DESCRIPTION

Figure 1:
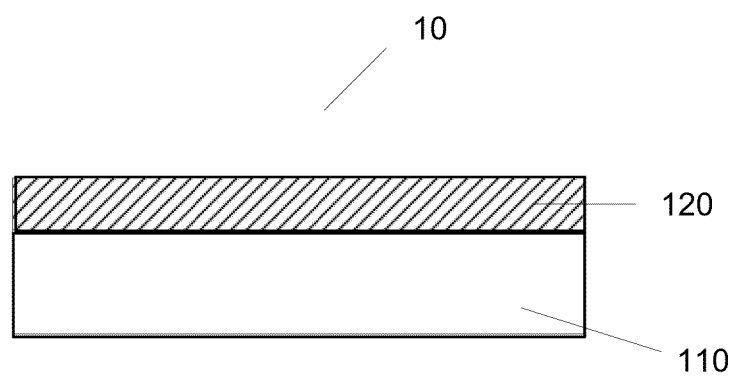
FIG. 1 is a structure schematic view of one exemplary embodiment of a lithium-sulfur battery separator.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
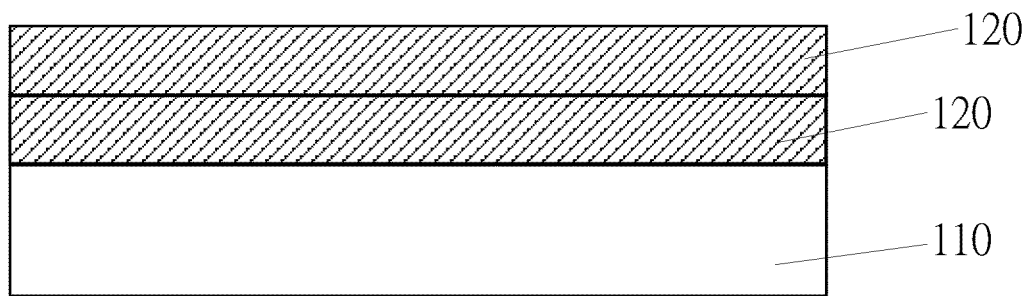
FIG. 2 shows surface morphology of a functional layer of the lithium-sulfur battery separator in FIG. 1.

Referring to FIG. 1, one embodiment is described in relation to a lithium-sulfur battery separator 10. The lithium-sulfur battery separator 10 comprises a separator substrate 110 and at least one functional layer 120. The separator substrate 110 comprises a first surface and a second surface opposite to the first surface. The at least one functional layer 120 is coated on at least one surface of the first surface and the second surface. Referring to FIG. 2, in one embodiment, the lithium-sulfur battery separator 10 comprises at least two functional layers 120, and the at least two functional layers 120 are cross-stacked with each other.

The separator substrate 110 can be a film. In an example, the separator substrate 110 can be a microporous polyolefin membrane. The microporous polyolefin membrane comprises a polypropylene (PP) film, a polyethylene (PE) film, or a multilayer composite film of the PP film and the PE film. The separator substrate 110 comprises a plurality of micropores. In one embodiment, the separator substrate 110 is a PP film having a thickness of 20 micrometers.

Figure 3:
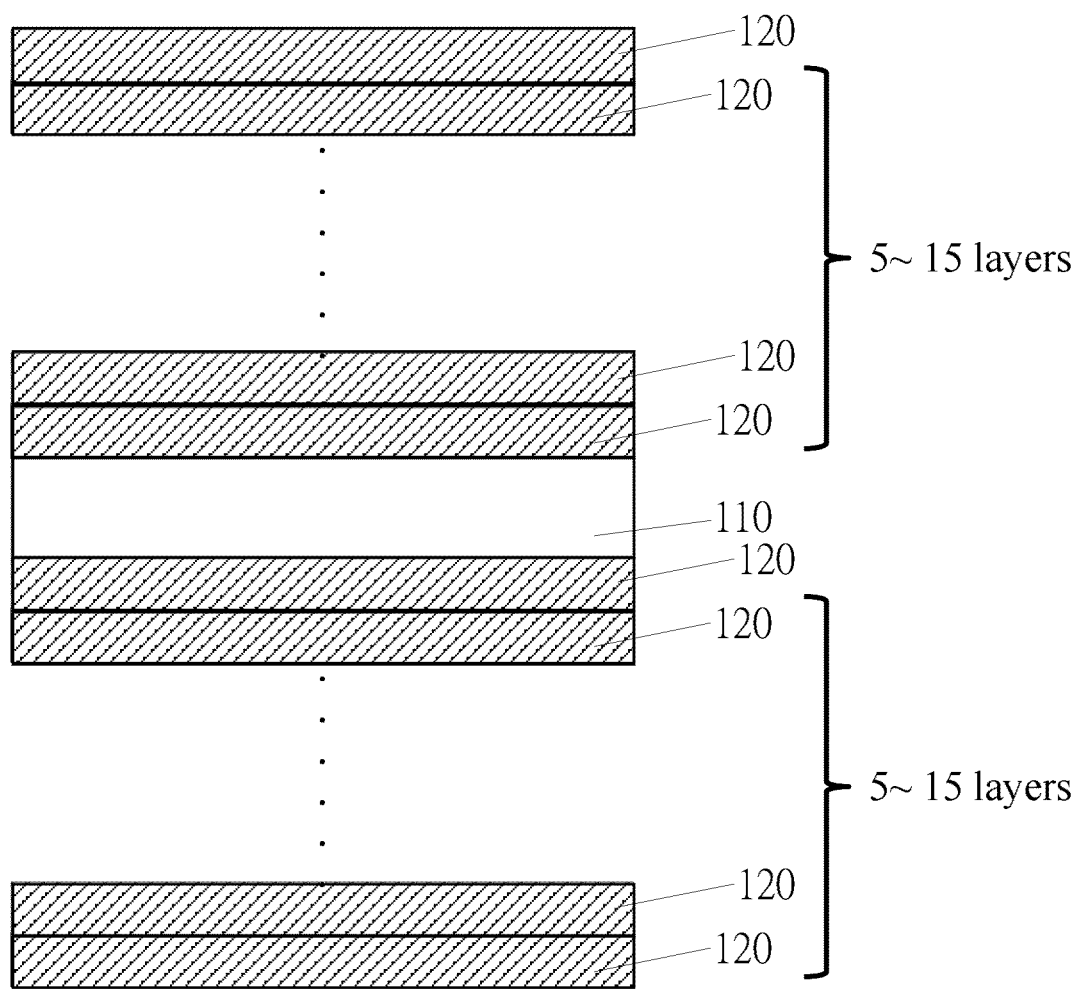
FIG. 3 is a structure schematic view of one exemplary embodiment of a lithium-sulfur battery separator.
Figure 4:
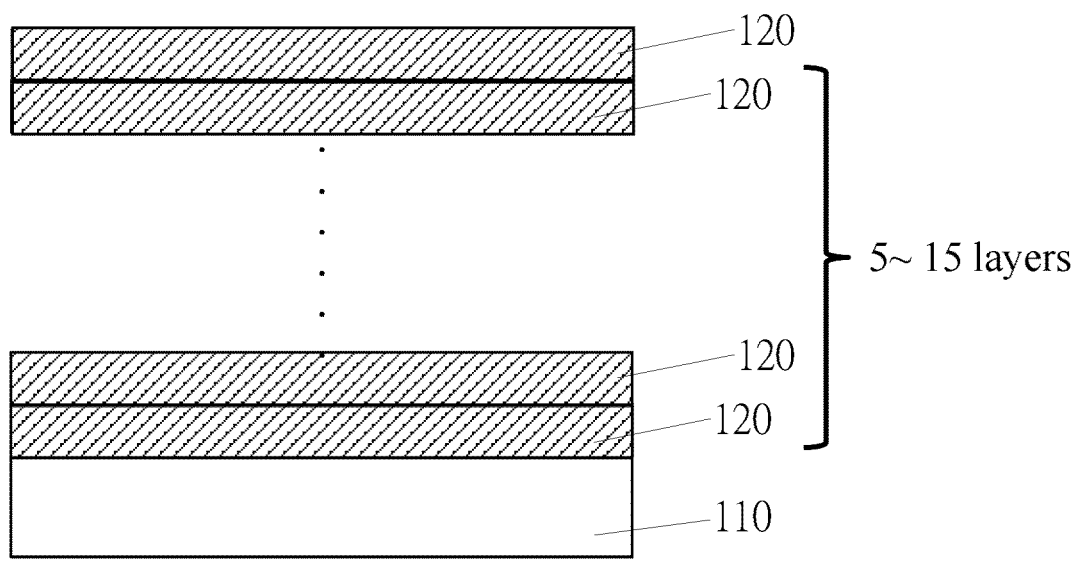
FIG. 4 is a structure schematic view of one exemplary embodiment of a lithium-sulfur battery separator.

The number of the functional layers 120 can be selected according to actual needs. Referring to FIG. 3, in one embodiment, both the first surface and the second surface are coated with the functional layer 120, the number of the functional layers 120 on each surface of the first surface and the second surface is about 5 layers to about 15 layers. Referring to FIG. 4, in one embodiment, the functional layer 120 is only coated on the first surface, and the number of the functional layers 120 is from about 5 layers to about 15 layers. In another embodiment, the functional layer 120 is only coated on the first surface, and the number of the functional layers 120 is 10 layers.

Figure 5:
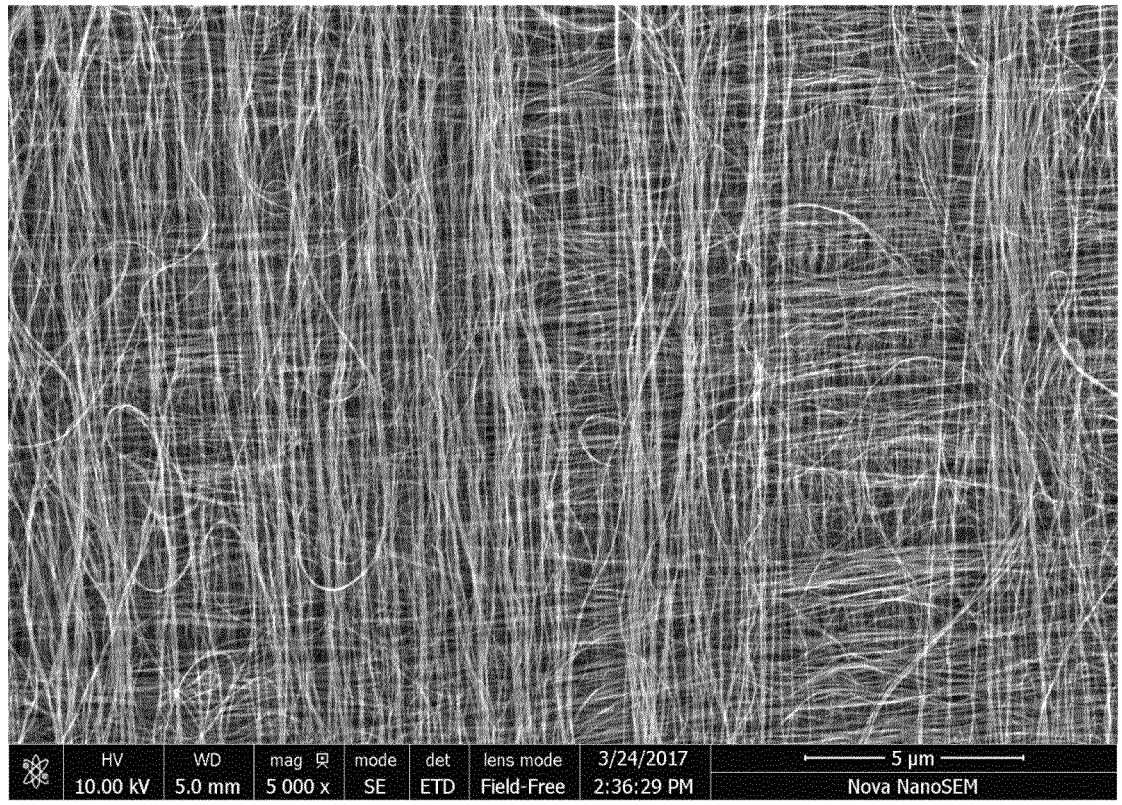
FIG. 5 is a structure schematic view of one exemplary embodiment of a lithium-sulfur battery separator.

Referring to FIG. 5, an electron microscope image of the functional layer 120 shows that the functional layer 120 is a smooth porous structure comprising a plurality of pores. A pore size of each of the plurality of pores is from about 1 micrometer to about 3 micrometers.

Figure 6:
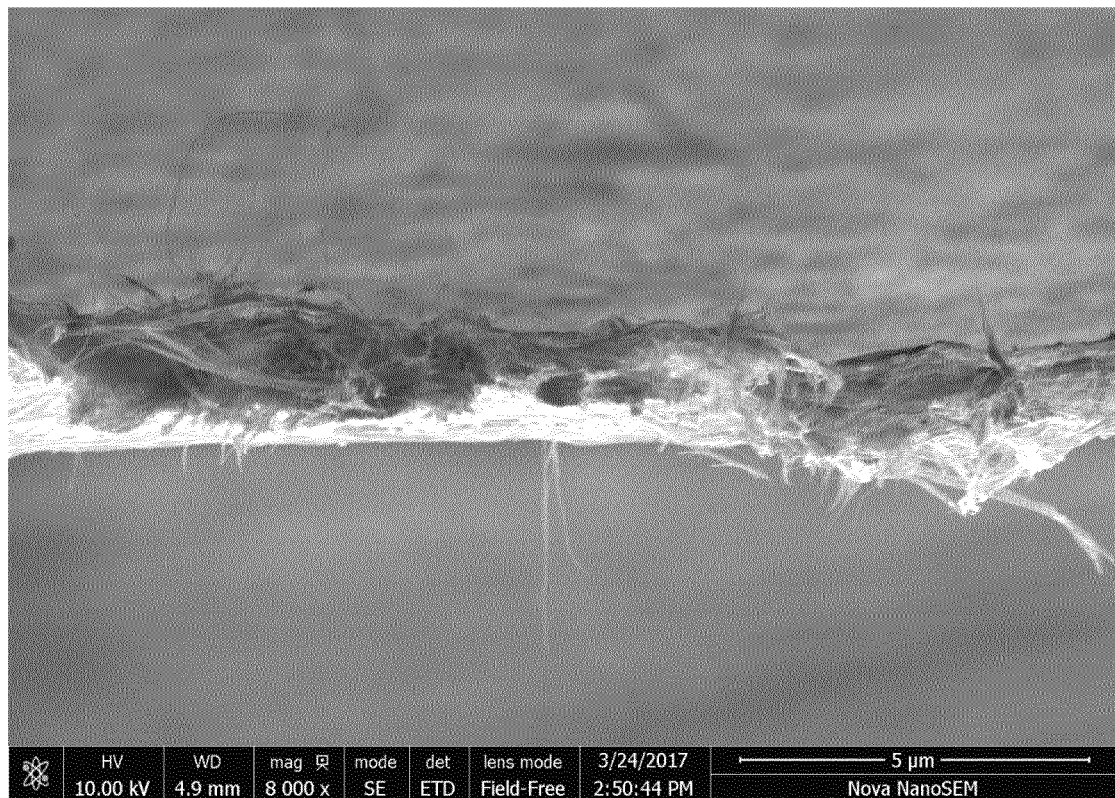
FIG. 6 shows cross-section morphology of a functional layer of the lithium-sulfur battery separator in FIG. 1.

A thickness of the functional layer 120 is from about 0.1 micrometer to about 0.3 micrometers. FIG. 6 shows a cross-sectional topography of 10-layer functional layers 120 stacked with each other, it can be seen that a total thickness of 10-layer functional layers 120 is about 1.5 micrometers.

Figure 7:
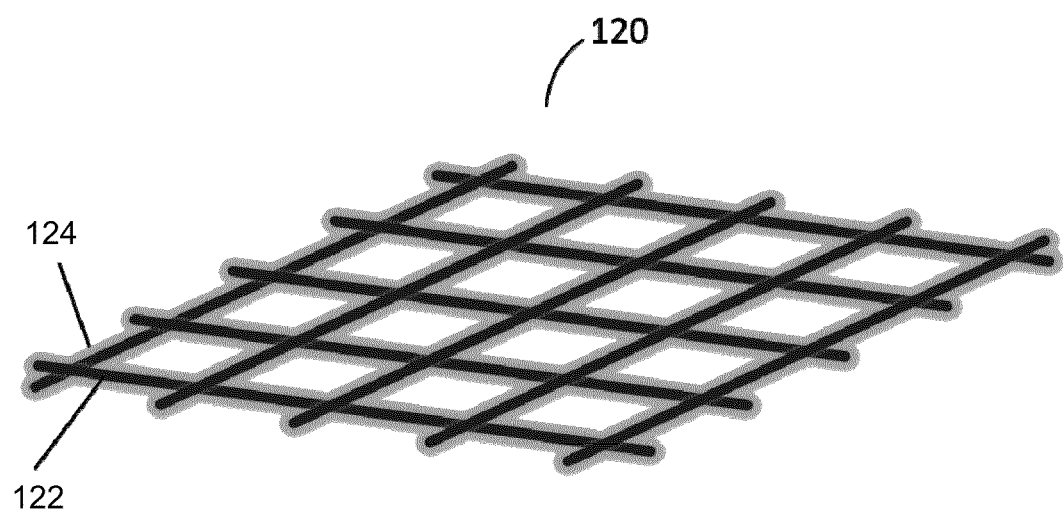
FIG. 7 is a structure schematic view of a functional layer of the lithium-sulfur battery separator in FIG. 1.

Referring to FIG. 7, the functional layer 120 comprises a carbon nanotube layer 122 and a hafnium oxide ($HfO_2$) layer 124. The carbon nanotube layer 122 comprises a plurality of carbon nanotubes. The $HfO_2$ layer 124 comprises a plurality of $HfO_2$ nanoparticles. The $HfO_2$ nanoparticles are adsorbed on surfaces of the carbon nanotubes. The thickness of $HfO_2$ nanolayer is about 1 nanometer to about 5 nanometers. In one embodiment, the thickness of $HfO_2$ nanolayer is about 3 nanometers. In one embodiment, a surface of each carbon nanotube comprises uniform and continuous defects, the $HfO_2$ nanoparticles being adsorbed on the uniform and continuous defects. The $HfO_2$ nanoparticles form a continuous $HfO_2$ layer on the surfaces of the carbon nanotubes. The uniform and continuous defects are depressions on the surfaces of the carbon nanotubes. Each depression can be a dot-shaped depression or a linear depression. The uniform and continuous defects can be formed by etching the surfaces of the carbon nanotubes. Each uniform and continuous defect can further comprise a functional group, the functional group is beneficial for a surface adsorption of Hf source and an adsorption of polar polysulfides. The functional group can also improve electrolyte wettability of the functional layer. In one embodiment, the functional group is an oxygen-containing functional group.

The carbon nanotube layer 122 can be a porous structure. The carbon nanotube layer 122 can be one carbon nanotube film or at least two carbon nanotube films stacked and crossed with each other. In one embodiment, the carbon nanotube layer 122 comprises at least two drawn carbon nanotube films stacked and crossed with each other. In another embodiment, the carbon nanotube layer 122 consists of at least two drawn carbon nanotube films stacked and crossed with each other. A large number of carbon nanotubes in the drawn carbon nanotube film can be oriented along a preferred direction, meaning that a large number of the carbon nanotubes in the drawn carbon nanotube film are arranged substantially along the same direction. A minority of carbon nanotubes in the drawn carbon nanotube film may be randomly aligned. However, the number of randomly aligned carbon nanotubes is very small and does not affect the overall alignment of the majority of carbon nanotubes in the drawn carbon nanotube film.

When the number of the carbon nanotube films of the carbon nanotube layer 122 is small, the lithium-sulfur battery separator does not provide good mechanical support for a volume exchange of sulfur and a conductive path will be short, which is adverse for polysulfide adsorption and conversion. When the number of the carbon nanotube films of the carbon nanotube layer 122 is large, it is difficult to ensure that the surface of each carbon nanotube adsorbs $HfO_2$ nanoparticles, and as a result, the shuttle effect of polysulfides generated during the reaction is difficult to limit. In one embodiment, the carbon nanotube layer 122 comprises 2-4 layers of drawn carbon nanotube films stacked and crossed with each other, an angle between adjacent carbon nanotube films is about 90 degrees. In one embodiment, the carbon nanotube layer 122 comprises two drawn carbon nanotube films stacked and crossed with each other, an angle between the two carbon nanotube films is about 90 degrees.

When a thickness of the $HfO_2$ layer 124 is small, the shuttle of polysulfide generated during the reaction cannot be effectively limited. When the thickness of the $HfO_2$ layer 124 is large, insulation of the $HfO_2$ layer 124 will result in low electrode reaction kinetics, which will lead to poor electrochemical performance. In one embodiment, the thickness of the $HfO_2$ layer 124 is from about 1.0 nanometer to about 5.0 nanometers. In one embodiment, the thickness of the $HfO_2$ layer 124 is from about 2.5 nanometers to about 3.5 nanometers. In another embodiment, the thickness of the $HfO_2$ layer 124 is about 3.0 nanometers.

An area density of the functional layer 120 is about 0.08 $mg/cm^2$ to about 0.10 $mg/cm^2$. The area density of the functional layer 120 is defined as mass per one square centimeter of the functional layer 120. In one embodiment, the area density of the $HfO_2$ layer 124 is about 0.087 $mg/cm^2$.

The carbon nanotubes of the carbon nanotube layer 122 can form a dispersed carbon nanotube conductive network. The $HfO_2$ layer 124 and the dispersed carbon nanotube conductive network can greatly improve the surface interaction between the functional layer 120 and solvents. When 1.5 μL of deionized water is dropped onto the functional layer 120, a contact angle between the functional layer 120 and the deionized water is about 13.4°, which shows that the functional layer 120 has excellent wettability. Such excellent wettability of the functional layer 120 greatly increases the active sites for electrochemical reaction between the active materials and electrolyte. Moreover, the highly polararized polyslufides can be effectively adsorbed and utilized by the functional layer 120.

The lithium-sulfur battery separator 10 has many advantages. First, the carbon nanotube layer 122 has a large specific surface area, which allows uniform deposition of the $HfO_2$ nanoparticles on the carbon nanotube layer 122. A charge transfer process for the surface adsorption and conversion of polysulfides is accelerated. Second, a surface catalytic adsorption capability on the polysulfide of the $HfO_2$ layer 124 is excellent; a contact area between the polysulfide and the lithium-sulfur battery separator is increased by a well-dispersed conductive carbon nanotube network and the ultra-thin $HfO_2$ layer. Thereby, the surface adsorption reaction of the lithium sulfur battery separator is greatly improved, and the polysulfide shuttling phenomenon is greatly suppressed.

Referring to FIG. 8, a method for making the lithium-sulfur battery separator 10 is disclosed. The method comprises any of the following steps:

step (S1), providing a separator substrate 110, wherein the separator substrate 110 comprises a first surface and a second surface opposite to the first surface; and step (S2), forming a functional layer 120 on at least one surface of the first surface and the second surface, which comprises sub-steps of:

step (S21), providing a carbon nanotube layer 122 comprising a plurality of carbon nanotubes on at least one surface of the first surface and the second surface;

step (S22), forming a plurality of uniform and continuous defects on surfaces of the plurality of carbon nanotubes by etching the carbon nanotube layer 122; and step (S23), forming a hafnium oxide ($HfO_2$) layer 124 on surfaces of the plurality of carbon nanotubes to form a carbon nanotube/$HfO_2$ composite layer.

In more detail, in step (S2), the functional layer 120 can be directly laid on the separator substrate 110, and then the functional layer 120 is infiltrated with ethanol to combine the functional layer 120 with the separator substrate 110.

In one embodiment, forming at least two functional layers 120 on at least one of the first surface and the second surface, the at least two functional layers 120 are stacked with each other.

In one embodiment, step (S22) is bypassed, step (S2) comprises sub-steps of:

step (T21), providing a carbon nanotube layer 122 comprising a plurality of carbon nanotubes; and step (T22), forming a $HfO_2$ layer 124 on surfaces of the plurality of carbon nanotubes to form a carbon nanotube/$HfO_2$ composite layer.

Step (S21) further comprises a step of laying the carbon nanotube layer 122 on a mounting plate, the mounting plate can be a glass, a metal frame, or at least two supports arranged at a certain distance. When the carbon nanotube layer 122 is laid on the mounting plate, the method for forming the at least one functional layer 120 further comprises separating the carbon nanotube/$HfO_2$ composite layer from the mounting plate. In one embodiment, the carbon nanotube layer is laid on the metal frame, and the carbon nanotube/$HfO_2$ composite layer is separated from the metal frame by laser cutting.

The carbon nanotube layer 122 comprises one carbon nanotube film or at least two carbon nanotube films stacked and crossed with each other. In one embodiment, the carbon nanotube film is drawn from a carbon nanotube array via a stretch tool. The carbon nanotube film is directly laid on the separator substrate 110 after being drawn from the carbon nanotube array. In one embodiment, a height of the carbon nanotube array is about 300 micrometers. A diameter of the carbon nanotubes of the carbon nanotube array can range from about 20 nanometers to about 30 nanometers. A method of the carbon nanotube film being drawn is taught by U.S. Pat. No. 8,048,256 to Feng et al. In one embodiment, the carbon nanotube layer 122 comprises 5 carbon nanotube films stacked and vertically crossed with each other, step (S21) comprises steps of: laying a first carbon nanotube film on a surface of the metal frame; laying a second carbon nanotube film on a surface of the first carbon nanotube film, wherein a first extending direction of the carbon nanotubes in the first carbon nanotube film is substantially perpendicular with a second extending direction of the carbon nanotubes in the second carbon nanotube film. The above steps are repeated until the carbon nanotube layer comprising 5 carbon nanotube films stacked and vertically crossed with each other is obtained.

In step (S22), in one embodiment, reactive ions are used to etch the carbon nanotube layer 122. The reactive ions etching can be implemented by using oxygen plasma, argon plasma, or the like. In one embodiment, the reactive ions etching is implemented by using the oxygen plasma in an etching device. A flow rate of the oxygen plasma is about 30 sccm to about 50 sccm and a pressure is about 5 Pa to about 15 Pa. A power is about 15 W to about 25 W, and an etching time is about 5 seconds to about 15 seconds. In one embodiment, the reactive ions etching is implemented by using the oxygen plasma, the flow rate of the oxygen plasma is about 40 sccm, the pressure is about 10 Pa, the power is about 20 W, and the etching time is about 10 seconds. When the reactive ions etching is implemented by using the oxygen plasma, physical defects and oxygen-containing functional groups can be simultaneously formed on the surface of each carbon nanotube. The oxygen-containing functional groups are beneficial for a surface adsorption of hafnium source and an adsorption of polar polysulfides, the functional groups can also improve electrolyte wettability of intermediate functional layers.

In step (S23), in one embodiment, the $HfO_2$ layer 124 is continuous on surfaces of the plurality of carbon nanotubes. The $HfO_2$ layer 124 can be formed on surfaces of the plurality of carbon nanotubes by an atomic layer deposition (ALD) method, which comprises:

step (S231), putting the carbon nanotube layer into a deposition chamber;

step (S232), applying a hafnium precursor into the deposition chamber, and vacuum pumping after a first reaction period;

step (S233) forming a cycle of hafnium oxide deposition layer on surfaces of the plurality of carbon nanotubes by applying an oxygen precursor into the deposition chamber and vacuum pumping after a second reaction period; and step (S234), repeating step (S232) and step (S233) at least one time to form the hafnium oxide layer.

In step (S232), in one embodiment, the hafnium precursor is hafnium tetra chloride ($HfCl_4$) gas. The first reaction period is about 0.3 seconds to about 0.7 seconds. A first vacuum pumping time is about 1 second to about 3 seconds.

In step (S233), in one embodiment, the oxygen precursor is water vapor ($H_2O$). The second reaction period is about 0.1 seconds to about 0.4 seconds. A second vacuum pumping time is about 0.5 seconds to about 2 seconds.

The hafnium precursor and the oxygen precursor can be applied in the deposition chamber by carrier gas. The carrier gas can comprises high purity nitrogen or high purity argon. A flow rate of the carrier gas is about 150 sccm to about 200 sccm.

In step (S234), in one embodiment, the step (S232) and step (S233) are repeated 17 to 21 times to obtain 18 to 22 cycles of $HfO_2$ deposition layers. A thickness of each $HfO_2$ deposition layer is about 0.1 nanometers to about 0.2 nanometers.

In one embodiment, the carrier gas is the high purity nitrogen, and the flow rate of the carrier gas is about 200 sccm. The method for forming the continuous hafnium oxide layer 124 in this embodiment comprises applying the $HfCl_4$ gas into the deposition chamber through the high purity nitrogen, exposing the carbon nanotube layer 122 to the $HfCl_4$ gas for 0.5 seconds, and vacuum pumping for 2 seconds. The water vapor is brought into the deposition chamber through the high purity nitrogen, to obtain one cycle of $HfO_2$ deposition layer after 0.25 seconds reaction time, wherein the thickness of the cycle of $HfO_2$ deposition layer is about 0.1 nanometers to about 0.2 nanometers. The above steps are repeated 21 times.

Figure 9:
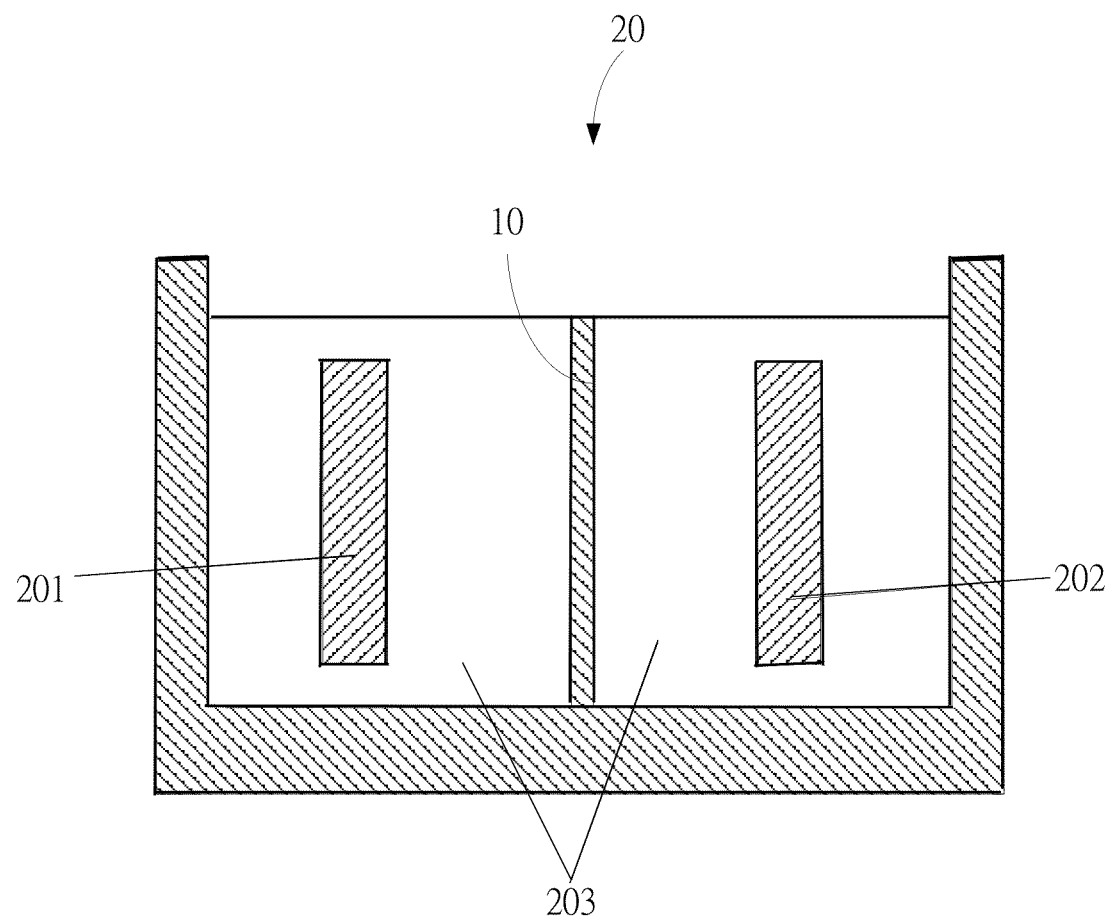
FIG. 9 is a structure schematic view of one exemplary embodiment of a lithium-sulfur battery.

Referring to FIG. 9, one embodiment is described in relation to a lithium-sulfur battery 20. The lithium-sulfur battery 20 comprises a positive electrode 201, a negative electrode 202, a lithium-sulfur battery separator 10, and an electrolytic solution 203. The lithium-sulfur battery separator 10 is located between the positive electrode 201 and the negative electrode 202. The positive electrode 201 is a composite electrode comprising sulfur and carbon nanotubes, and a weight ratio between the sulfur and the positive electrode is about 65 wt % to about 70 wt %. An area density of the sulfur is about 1.80 mg/cm$^2$ to about 2.10 mg/cm$^2$. The carbon nanotubes have high strength as a mechanical property, conductivity, and large aspect ratio, thus the positive electrode 201 has excellent mechanical properties and conductivity even if the positive electrode is free of polymer binder. The lithium-sulfur battery also has large energy density even if the lithium-sulfur battery is free of polymer binder. The negative electrode is a metallic lithium foil. The lithium-sulfur battery separator is the lithium-sulfur battery separator 10.

A method for making the composite electrode comprising sulfur and carbon nanotubes comprises making oxidized carbon nanotubes, dispersing the oxidized carbon nanotubes and a sulfur powder in a solution by ultrasound agitation, and vacuum filtering and drying to obtain a sulfur-carbon nanotube composite film. The sulfur-carbon nanotube composite film is heat treated to obtain the composite electrode comprising sulfur and carbon nanotubes.

In one embodiment, the method for making the composite electrode comprising sulfur and carbon nanotubes comprises dispersing a carbon nanotube array in a mixed solution of $HNO_3$ and $H_2SO_4$, wherein a mass ratio of the $HNO_3$ and the $H_2SO_4$ is about 3:1, and heating the mixed solution of $HNO_3$ and $H_2SO_4$ to 80° C. This temperature is maintained for 4 hours to obtain the oxidized carbon nanotubes. The oxidized carbon nanotubes and the sulfur powder are dispersed in a mixed solution of ethanol and water by ultrasonically treating for 30 minutes at 1000 W power. Vacuum filtering and drying at 50° C. are applied to obtain the sulfur-carbon nanotube composite film and the sulfur-carbon nanotube composite film is placed in a stainless steel reactor and heat treated at 155° C. for 8 hours.

EXAMPLE 1

In the lithium-sulfur battery of this example, the positive electrode is the composite electrode comprising sulfur and carbon nanotubes. The negative electrode is the metallic lithium foil. The electrolytic solution is 1 M lithium bis (trifluoromethanesulfonyl)imide (LiTFSI) solution with 0.2 M $LiNO_3$ as additive.

The lithium-sulfur battery separator comprises the separator substrate and ten functional layers located on one surface of the separator substrate, the ten functional layers are stacked with each other. The separator substrate is a polypropylene film. Each of the ten functional layers comprises a carbon nanotube layer and a $HfO_2$ layer. The carbon nanotube layer comprises two drawn carbon nanotube films stacked and vertically crossed with each other. The thickness of the $HfO_2$ layer is about 2.0 nanometers to about 3.0 nanometers.

COMPARATIVE EXAMPLE 1

In this comparative example, the lithium-sulfur battery is the same as that in Example 1, except that the lithium-sulfur battery separator is a polyethylene film. The polyethylene film is the same as that in Example 1.

Figure 10:
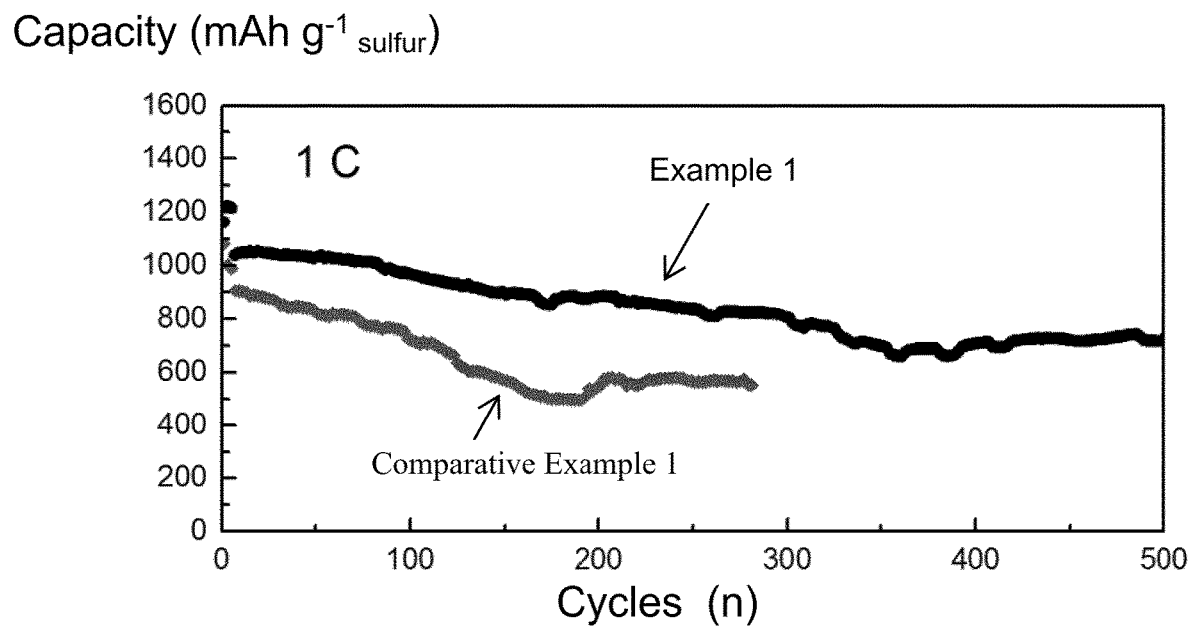
FIG. 10 shows constant current charge-discharge test curves of a lithium-sulfur battery of Example 1 and a lithium-sulfur battery of Comparative Example 1.

Referring to FIG. 10, the lithium-sulfur battery in Example 1 is charged and discharged at a constant rate of 1.0 C, after a charge/discharge cycle is performed 500 times. A capacity of the lithium-sulfur battery of Example 1 is about 721 mA h g$^{-1}$, a capacity retention ratio of the lithium-sulfur battery of Example 1 is about 67.8%. However, a capacity of the lithium-sulfur battery of Comparative Example 1 is only 600 mA h g$^{-1}$ after the charge/discharge cycle is performed 150 times, and the lithium-sulfur battery of Comparative Example 1 is short-circuited during the 280th charge/discharge cycle. It shows that the capacity and the capacity retention ratio of the lithium-sulfur battery of Example 1 are greatly improved compared with the lithium-sulfur battery of Comparative Example 1.

Figure 11:
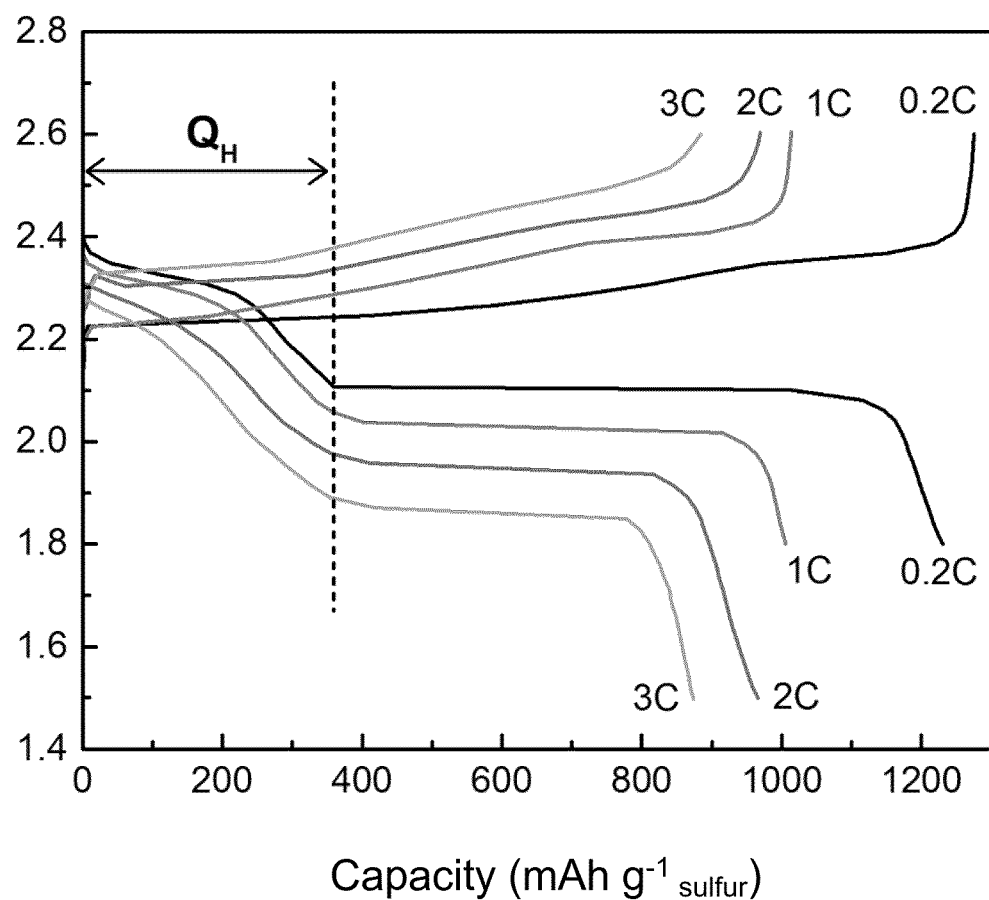
FIG. 11 shows charge-discharge voltage profiles at different current densities of the lithium-sulfur battery of Example 1.

Referring to FIG. 11, it can be seen that the lithium-sulfur battery of Example 1 has two typical discharge plateaus of 2.35V and 2.10V, wherein the high voltage plateau 2.35 V is for a conversion from cyclo-$S_8$ to polysulfides, and the low voltage plateau 2.10V is for a major discharge process from polysulfides to $Li_2S_2/Li_2S$. It shows that the loss of active sulfur in the lithium-sulfur battery is greatly suppressed by the lithium-sulfur battery separator of Example 1, the shuttle effect is avoided between the cathode and the anode, and the electrochemical reactivity of the lithium-sulfur battery is improved. It can also be seen that the electrode exhibits a stable voltage plateau as the current density increases, and electrode polarization is small at different current densities. The electrochemical kinetics are improved.

Figure 12:
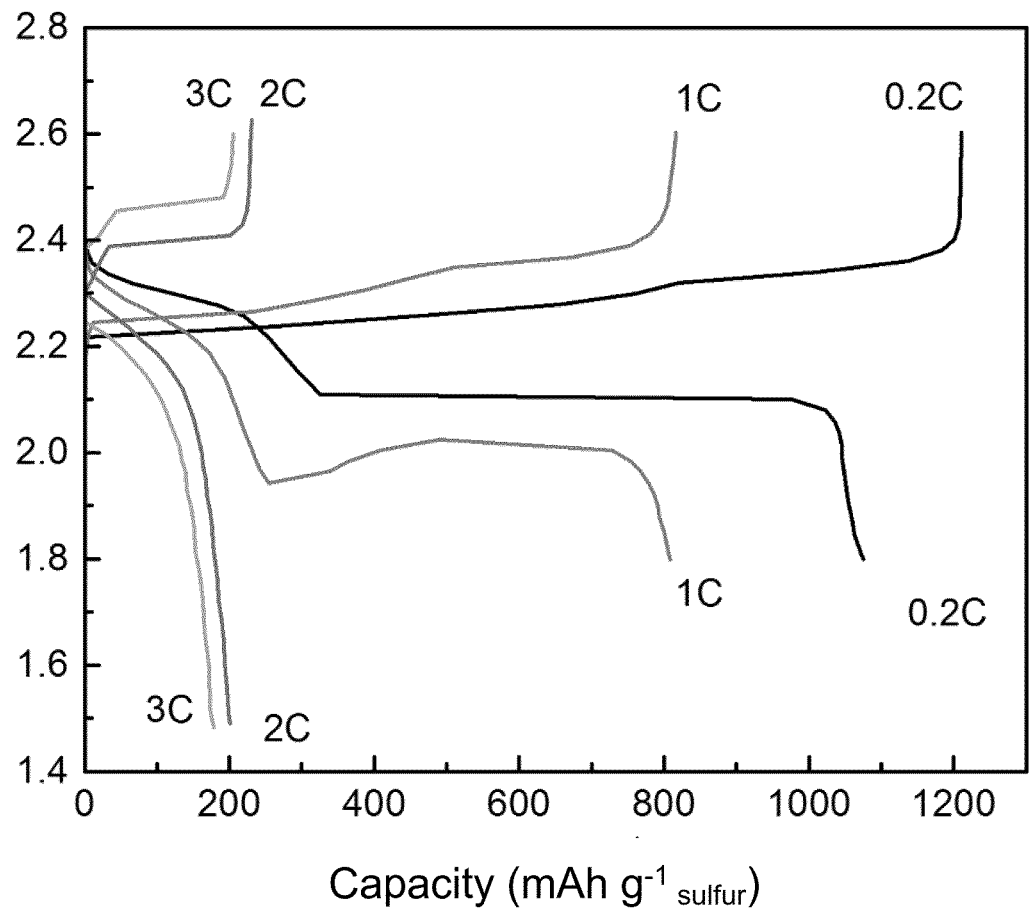
FIG. 12 shows charge-discharge voltage profiles at different current densities of the lithium-sulfur battery of Comparative Example 1.

Referring to FIG. 12, it can be seen that a main voltage plateau of the lithium-sulfur battery of Comparative Example 1 degrades severely as the current density increased to 2 C, which shows that most polysulfides had dissolved into the electrolyte and a further nucleation conversion to $Li_2S_2/Li_2S$ was not performed at high rates.

Figure 13:
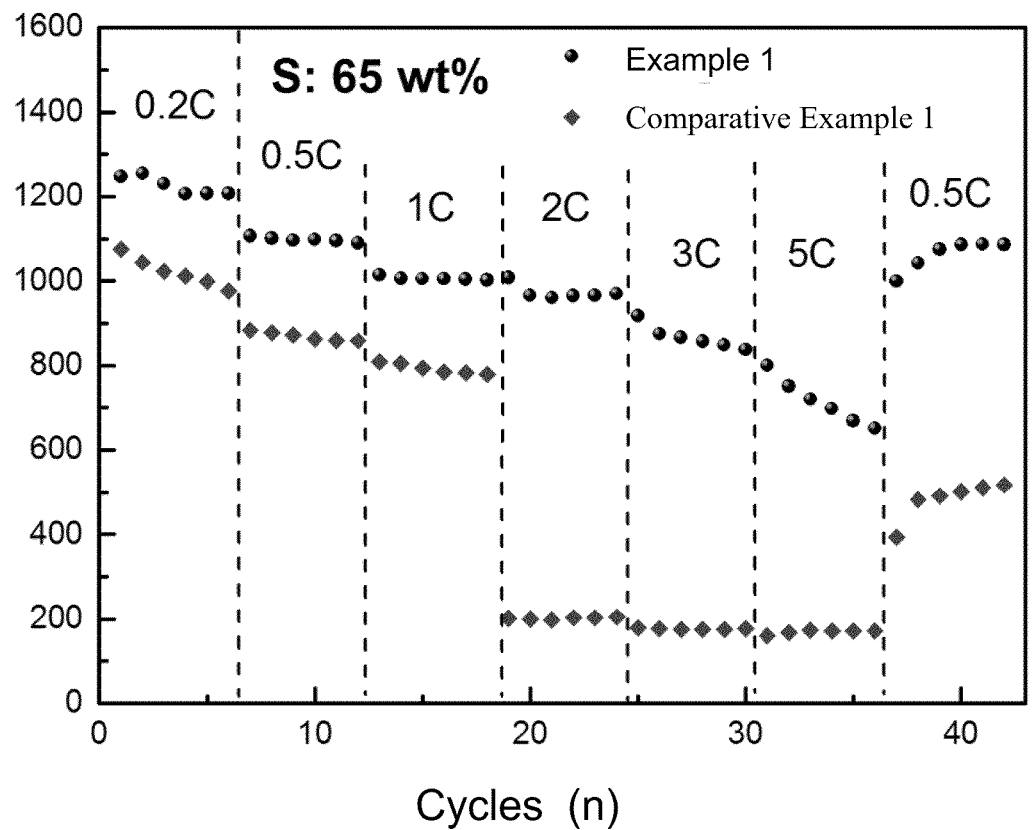
FIG. 13 shows cyclic stability at different charge/discharge rates of the lithium-sulfur battery of Example 1 and Comparative Example 1.

Referring to FIG. 13, it can be seen that the lithium-sulfur battery of Example 1 demonstrates discharge capacities of 1255 mA h g$^{-1}$, 1107 mA h g$^{-1}$, 1014 mA h g$^{-1}$, 970 mA h g$^{-1}$, 918 mA h g$^{-1}$, and 800 mA h g$^{-1}$ at 0.2 C, 0.5 C, 1 C, 5 C, 7 C, and 10 C, respectively. Compared with the lithium-sulfur battery of Comparative Example 1, the lithium-sulfur battery of Example 1 has larger discharge capacity and smaller battery capacity decay ratio.

Figure 14:
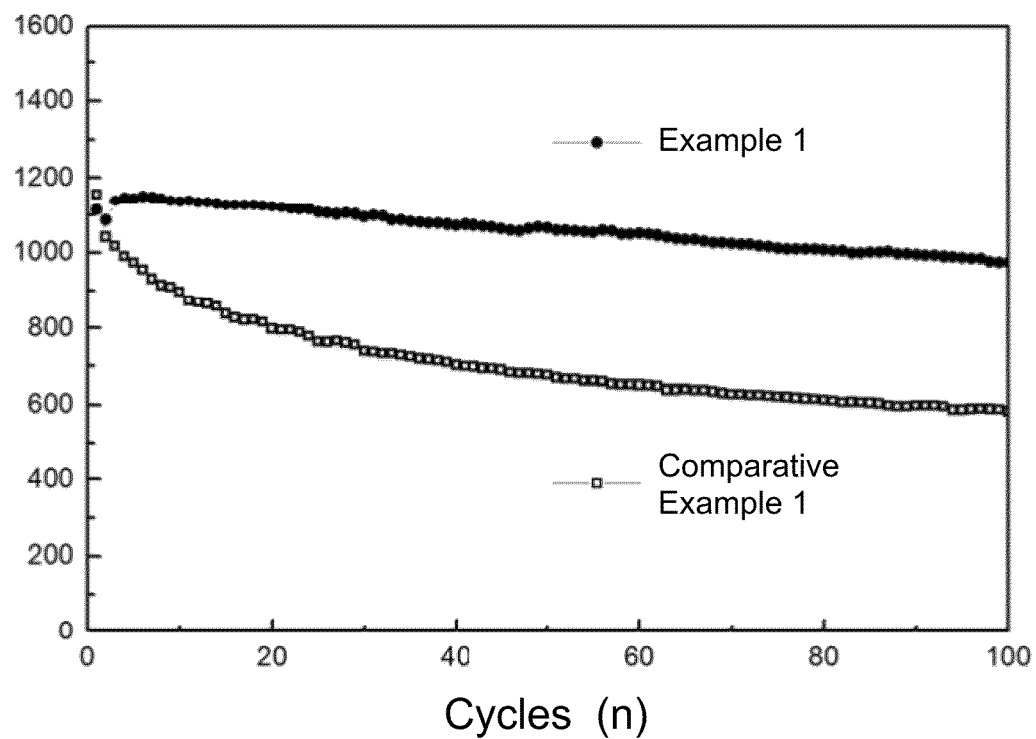
FIG. 14 shows a cyclic stability of the lithium-sulfur battery of Example 1 and the lithium-sulfur battery of Comparative Example 1 at 0.2 C.

Referring to FIG. 14, it can be seen that after 100 charge/discharge cycles at constant rate of 0.2 C, a discharge capacity of the lithium-sulfur battery of Example 1 is about 947 mA h g$^{-1}$, and a coulombic efficiency is up to 88% . However, the lithium-sulfur battery of Comparative Example 1 exhibited an obvious capacity fading process, after 100 charge/discharge cycles at constant rate of 0.2 C, a discharge capacity of the lithium-sulfur battery of Comparative Example 1 is about 582 mA h g$^{-1}$, and a coulombic efficiency is only up to 50%.

Figure 15:
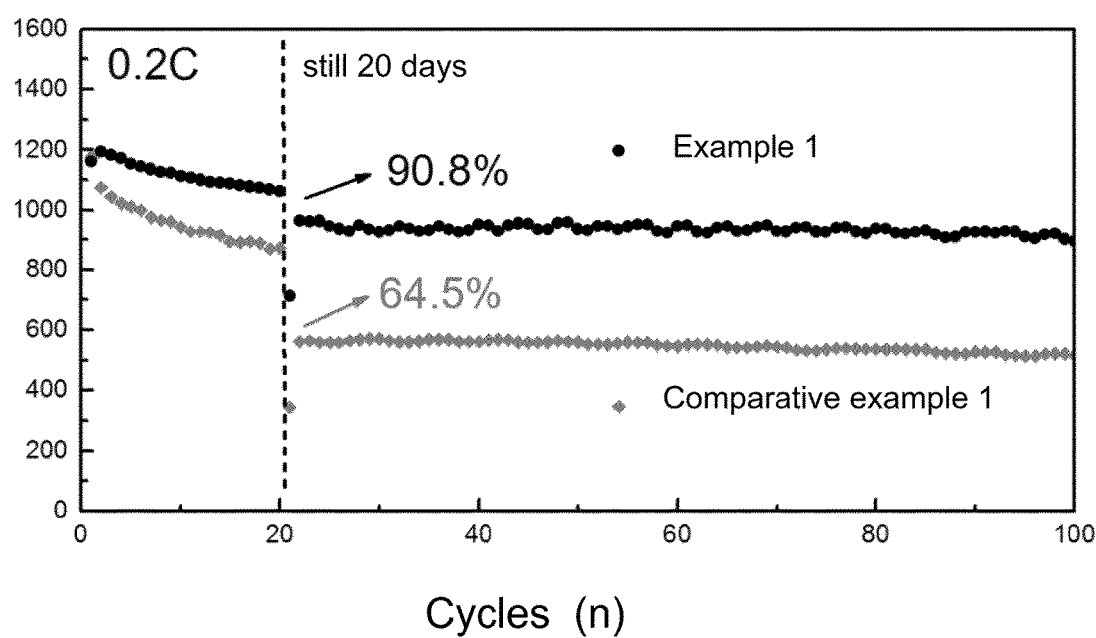
FIG. 15 shows self-discharge test curves of the lithium-sulfur battery of Example 1 and the lithium-sulfur battery of Comparative Example 1 after standing for 20 days.

Referring to FIG. 15, the lithium-sulfur battery of Example 1 still has excellent stability after standing for 20 days. After 20 charge/discharge cycles at constant rate of 0.2 C, a discharge capacity retention ratio of the lithium-sulfur battery of Example 1 is about 90.8%, and the lithium-sulfur battery of Example 1 shows excellent stability during 100 charge/discharge cycles process. However, the discharge capacity of the lithium-sulfur battery of Comparative Example 1 has an obvious decay after standing for 20 days, after 20 charge/discharge cycles at constant rate of 0.2 C, a discharge capacity retention ratio of the lithium-sulfur battery of Comparative Example 1 is only 64.5%. The lithium-sulfur battery in Example 1 was substantially free from self-discharge, however, the lithium-sulfur battery in Comparative Example 1 shows serious self-discharge phenomenon.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making a lithium-sulfur battery separator comprising:
    step (S1), providing a separator substrate comprising a first surface and a second surface opposite to the first surface; and
    step (S2), forming a functional layer on the first surface, wherein forming the functional layer on the first surface comprises:
        step (S21), forming a carbon nanotube layer comprising a plurality of carbon nanotubes on the first surface;
        step (S22) forming defects on surfaces of the plurality of carbon nanotubes by etching the carbon nanotube layer; and
        step (S23) applying a hafnium oxide layer on the defects to form a carbon nanotube/hafnium oxide composite layer.

2. The method of claim 1, wherein etching the carbon nanotube layer is performed by oxygen plasma in an etching device.

3. The method of claim 2, wherein a flow rate of a gas is about 30 sccm to about 50 sccm, a gas pressure of the gas is about 5 Pa to about 15 Pa, a treating power is about 15 W to about 25 W, and an etching time is about 5 seconds to about 15 seconds.

4. The method of claim 1, wherein the hafnium oxide layer is formed on surfaces of the plurality of carbon nanotubes by an atomic layer deposition method, and the atomic layer deposition method comprises:
    step (S231), putting the carbon nanotube layer into a deposition chamber;
    step (S232), applying a hafnium precursor into the deposition chamber, and vacuum pumping after a first reaction period;
    step (S233) forming a cycle of hafnium oxide deposition layer on surfaces of the plurality of carbon nanotubes by applying an oxygen precursor into the deposition chamber and vacuum pumping after a second reaction period; and
    step (S234), repeating step (S232) and step (S233) at least one time to form the hafnium oxide layer.

5. The method of claim 4, wherein the hafnium precursor is hafnium tetra chloride gas.

6. The method of claim 5, wherein the first reaction period is about 0.3 seconds to about 0.7 seconds; and a first vacuum pumping time is about 1 second to about 3 seconds.

7. The method of claim 4, wherein the oxygen precursor is water vapor.

8. The method of claim 7, wherein the second reaction period is about 0.1 seconds to about 0.4 seconds; and a second vacuum pumping time is about 0.5 seconds to about 2 seconds.

9. The method of claim 4, wherein the hafnium precursor and the oxygen precursor are applied in the deposition chamber by a carrier gas, and a flow rate of the carrier gas is about 150 sccm to about 200 sccm.

10. The method of claim 4, wherein the step (S232) and step (S233) are repeated 17 to 21 times, and the hafnium oxide layer comprises 18 to 22 cycles of hafnium oxide deposition layers.

11. The method of claim 4, wherein a thickness of each cycle of hafnium oxide deposition layer is about 0.1 nanometers to about 0.2 nanometers.

12. The method of claim 1, wherein step (S2) further comprises forming at least two carbon nanotube/hafnium oxide composite layers on the first surface.

13. The method of claim 1, wherein:
    step (S21) further comprises laying the carbon nanotube layer on a mounting plate;
    step (S2) further comprises a step (S24), comprising separating the carbon nanotube/hafnium oxide composite layer from the mounting plate after step (S23).

14. The method of claim 1, further comprising forming another functional layer on a second surface opposite to the first surface.

15. The method of claim 1, wherein the carbon nanotube layer comprises one carbon nanotube film or at least two carbon nanotube films stacked and crossed with each other.

16. The method of claim 15, wherein the carbon nanotube film is drawn from a carbon nanotube array and directly laid on the separator substrate after being drawn from the carbon nanotube array.

17. The method of claim 1, wherein the hafnium oxide layer is a continuous film.

18. The method of claim 1, wherein step S2 further comprises forming the function layer to an area density of about 0.08 mg/cm$^2$ to about 0.10 mg/cm$^2$.

* * * * *